(12) United States Patent
Park et al.

(10) Patent No.: US 11,120,944 B2
(45) Date of Patent: Sep. 14, 2021

(54) CERAMIC ELECTRONIC COMPONENT INCLUDING CERAMIC NANOSHEETS HAVING MULTIMODAL LATERAL SIZE DISTRIBUTION AND METHOD OF MANUFACTURING THE SAME AND ELECTRONIC DEVICE

(71) Applicants: SAMSUNG ELECTRONICS CO., LTD., Suwon-si (KR); NATIONAL INSTITUTE FOR MATERIALS SCIENCE, Ibaraki (JP)

(72) Inventors: Hyeon Cheol Park, Hwaseong-si (KR); Takayoshi Sasaki, Ibaraki (JP); Minoru Osada, Ibaraki (JP); Chan Kwak, Yongin-si (KR); Daejin Yang, Yeongju-si (KR); Doh Won Jung, Seoul (KR); Youngjin Cho, Suwon-si (KR)

(73) Assignees: SAMSUNG ELECTRONICS CO., LTD., Gyeonggi-do (KR); NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 113 days.

(21) Appl. No.: 16/169,800

(22) Filed: Oct. 24, 2018

(65) Prior Publication Data
US 2019/0131075 A1    May 2, 2019

(30) Foreign Application Priority Data
Oct. 27, 2017    (KR) ......................... 10-2017-0141216

(51) Int. Cl.
*H01G 4/12*    (2006.01)
*H01G 4/30*    (2006.01)
(Continued)

(52) U.S. Cl.
CPC ............... *H01G 4/30* (2013.01); *H01G 4/005* (2013.01); *H01G 4/1209* (2013.01);
(Continued)

(58) Field of Classification Search
CPC ... H01G 4/1254; H01G 4/1218; H01G 4/1209
See application file for complete search history.

(56) References Cited

U.S. PATENT DOCUMENTS

| | | | |
|---|---|---|---|
| 7,092,237 B2 * | 8/2006 | Lee ........................ | H05K 1/162 361/303 |
| 8,184,426 B2 | 5/2012 | Osada et al. | |

(Continued)

FOREIGN PATENT DOCUMENTS

| | | |
|---|---|---|
| JP | 2011181726 | 9/2011 |
| JP | 5099710 | 12/2012 |

(Continued)

*Primary Examiner* — David M Sinclair
(74) *Attorney, Agent, or Firm* — Cantor Colburn LLP

(57) ABSTRACT

A ceramic electronic component includes a pair of electrodes facing each other and a dielectric layer disposed between the pair of electrodes and including a plurality of ceramic nanosheets, where the plurality of ceramic nanosheets has a multimodal lateral size distribution expressed by at least two separated peaks, a method of manufacturing the same, and an electronic device including the ceramic electronic component.

22 Claims, 14 Drawing Sheets

(51) Int. Cl.
*H01G 4/005* (2006.01)
*H01G 4/33* (2006.01)

(52) U.S. Cl.
CPC ......... *H01G 4/1218* (2013.01); *H01G 4/1227* (2013.01); *H01G 4/1254* (2013.01); *H01G 4/33* (2013.01)

(56) References Cited

U.S. PATENT DOCUMENTS

| | | | |
|---|---|---|---|
| 9,082,551 B2 | 7/2015 | Osada et al. | |
| 2003/0170432 A1* | 9/2003 | Kobayashi | H01G 4/30 428/209 |
| 2006/0258327 A1* | 11/2006 | Lee | H01G 4/206 455/352 |
| 2010/0226067 A1* | 9/2010 | Osada | H01L 21/02348 361/311 |
| 2011/0000698 A1 | 1/2011 | Osada et al. | |
| 2011/0232524 A1* | 9/2011 | Kim | C09D 11/30 106/31.13 |
| 2012/0028018 A1* | 2/2012 | Cho | H01G 4/129 428/220 |
| 2012/0087059 A1* | 4/2012 | Kagata | H01G 4/012 361/305 |
| 2012/0245016 A1* | 9/2012 | Curry | C08L 101/00 501/137 |
| 2013/0244016 A1* | 9/2013 | Osada | H01L 41/1876 428/216 |
| 2014/0150966 A1* | 6/2014 | Osada | B82Y 30/00 156/273.3 |

FOREIGN PATENT DOCUMENTS

| | | |
|---|---|---|
| KR | 1020140016356 | 2/2014 |
| KR | 101398553 | 5/2014 |

* cited by examiner

CERAMIC ELECTRONIC COMPONENT INCLUDING CERAMIC NANOSHEETS HAVING MULTIMODAL LATERAL SIZE DISTRIBUTION AND METHOD OF MANUFACTURING THE SAME AND ELECTRONIC DEVICE

CROSS-REFERENCE TO RELATED APPLICATION

This application claims priority to Korean Patent Application No. 10-2017-0141216, filed on Oct. 27, 2017, and all the benefits accruing therefrom under 35 U.S.C. § 119, the content of which in its entirety is herein incorporated by reference.

BACKGROUND

1. Field

A ceramic electronic component and a method of manufacturing the same, and an electronic device are disclosed.

2. Description of the Related Art

An electronic component using ceramic includes various elements such as a capacitor, an inductor, a piezoelectric device, a varistor, or a thermistor, etc. Among the various elements, the capacitor is an important component for providing an electronic circuit, which is an electronic component used for obtaining capacitance. A multi-layer ceramic capacitor ("MLCC"), which is one example of the capacitor, includes a plurality of capacitors and is formed in, for example, a chip shape, so that the MLCC may be disposed (e.g., mounted) in a flexible printed circuit ("FPC") of various electronic devices such as an image device of a liquid crystal display ("LCD"), a computer and a mobile phone, and the like to charge and discharge electricity, and the MLCC may be used in a device for coupling, decoupling, or impedance matching, and the like.

Recently, according to desires for providing an electronic device with a high function, a high efficiency, and a downsize, a ceramic electronic component such as a MLCC disposed (e.g., mounted) in the electronic device is also desired to be formed in a high performance and a down-size and further desired to have a low temperature dependency and/or voltage dependency as well as a high reliability.

SUMMARY

An embodiment provides a ceramic electronic component that is capable of embodying a small-size and a high capacitance as well as a high reliability.

Another embodiment provides a method of manufacturing a ceramic electronic component.

Yet another embodiment provides an electronic device including the ceramic electronic component.

According to an embodiment, a ceramic electronic component includes a pair of electrodes facing each other and a dielectric layer between the pair of electrodes and including a plurality of ceramic nanosheets, where the plurality of ceramic nanosheets has a multimodal lateral size distribution expressed by at least two separated peaks.

In an embodiment, the multimodal lateral size distribution may include a first peak shown at a lateral size greater than or equal to about 1.5 micrometers (µm) and a second peak separated from the first peak and shown in a smaller lateral size than the lateral size of the first peak.

In an embodiment, the lateral size at the first peak may be about 1.5 µm to about 10 µm, and the lateral size at the second peak may be less than or equal to about 1.0 µm.

In an embodiment, a ratio of the lateral sizes at the first peak and the second peak may be about 2:1 to about 10:1.

In an embodiment, the lateral size at the first peak may be about 2.0 µm to about 5.0 µm, and the lateral size at the second peak may be about 0.5 µm to about 1.0 µm, and a ratio of the lateral sizes at the first peak and the second peak may be about 2.4:1 to about 6:1.

In an embodiment, the plurality of ceramic nanosheets may include a first ceramic nanosheet group showing a lateral size distribution in a region of at least a part of about 1 µm to about 10 µm and having the first peak and a second ceramic nanosheet group having an average lateral size smaller than that of the first ceramic nanosheet group and having the second peak.

In an embodiment, the first ceramic nanosheet group and the second ceramic nanosheet group may be included in at a volume ratio of about 5:1 to about 100:1.

In an embodiment, the plurality of ceramic nanosheet may have a bimodal lateral size distribution represented by two peaks separated from each other.

In an embodiment, the dielectric layer may have a porosity less than or equal to about 9.0 percent (%), where the porosity may be a ratio of an area of pore to a total area of the dielectric layer.

In an embodiment, the plurality of ceramic nanosheets may have a permittivity greater than or equal to about 50.

In an embodiment, the plurality of ceramic nanosheets may include $Ca_2Nb_3O_{10}$, $Ca_2NaNb_4O_{13}$, $Ca_2Na_2Nb_5O_{16}$, $Sr_2Nb_3O_{10}$, $SrBi_4Ti_4O_{15}$, $Ti_2NbO_7$, $LaNb_2O_7$, or a combination thereof.

In an embodiment, the plurality of ceramic nanosheets may be a nanostructure exfoliated from ceramic powder.

In an embodiment, the dielectric layer may include plural layers of two dimensional ("2D") nanosheet monolayers including the plurality of ceramic nanosheets.

In an embodiment, a thickness of the dielectric layer may be less than or equal to about 0.5 µm.

In an embodiment, the dielectric layer may be disposed on one surface of a first dielectric layer including the plurality of ceramic nanosheets and a second dielectric layer disposed on one surface of the first dielectric layer and including a bulk dielectric layer.

In an embodiment, the dielectric layer may include a first dielectric layer including the plurality of ceramic nanosheets, a second dielectric layer disposed on one surface of the first dielectric layer and including the bulk dielectric layer, and a third dielectric layer disposed on one surface of the second dielectric layer and including the plurality of ceramic nanosheets.

In an embodiment, the ceramic electronic component may be a multi-layer ceramic capacitor ("MLCC"), where the MLCC may have a structure in which a unit capacitor including the pair of electrodes and the dielectric layer is laminated in plural.

According to another embodiment, a method of manufacturing a ceramic electronic component includes synthesizing a layered ceramic powder, exfoliating the layered ceramic powder to prepare a plurality of ceramic nanosheets having different lateral size distributions, providing the plurality of ceramic nanosheets on a first electrode to provide a dielectric layer, and providing a second electrode on the dielectric layer, where the plurality of ceramic nanosheets has a multimodal lateral size distribution expressed by at least two separated peaks.

In an embodiment, the preparing a plurality of ceramic nanosheets may include preparing a first ceramic nanosheet group having a lateral size distribution in a region of at least a part of about 1 μm to about 10 μm and showing a first peak in a lateral size greater than or equal to about 1.5 μm, preparing a second ceramic nanosheet group having a smaller average particle size than the average particle size of the first ceramic nanosheet group and showing a second peak in a lateral size smaller than the lateral size of the first peak, and mixing the first ceramic nanosheet group and the second ceramic nanosheet group.

In an embodiment, each of the preparing the first ceramic nanosheet group and the preparing the second ceramic nanosheet group may include performing at least one of a heat treatment and a centrifuging, and the preparing the first ceramic nanosheet group may include performing the heat treatment at a higher temperature than that in the preparing the second ceramic nanosheet group, and the preparing the first ceramic nanosheet group may include performing the centrifuging at a slower speed than that in the preparing the second ceramic nanosheet group.

In an embodiment, the mixing the first ceramic nanosheet group and the second ceramic nanosheet group may be performed with mixing the first ceramic nanosheet group and the second ceramic nanosheet group at a volume ratio of about 5:1 to about 100:1.

In an embodiment, the forming the dielectric layer may include preparing a ceramic nanosheet solution including the plurality of ceramic nanosheets and coating the ceramic nanosheet solution on the first electrode by a Langmuir-Blodgett method, a Layer-by-Layer method, a spin coating, a slit coating, a bar coating or a dip coating to provide a 2D nanosheet monolayer.

In an embodiment, the forming the dielectric layer may include repeatedly performing the providing the 2D nanosheet monolayer for a plurality of times to provide a plurality of 2D nanosheet monolayers.

According to another embodiment, an electronic device including the ceramic electronic component is provided.

It may accomplish to provide the ceramic electronic component with down-size and high capacitance.

BRIEF DESCRIPTION OF THE DRAWINGS

The above and other embodiments, advantages and features of this disclosure will become more apparent by describing in further detail embodiments thereof with reference to the accompanying drawings, in which.

DETAILED DESCRIPTION

Figure 1:
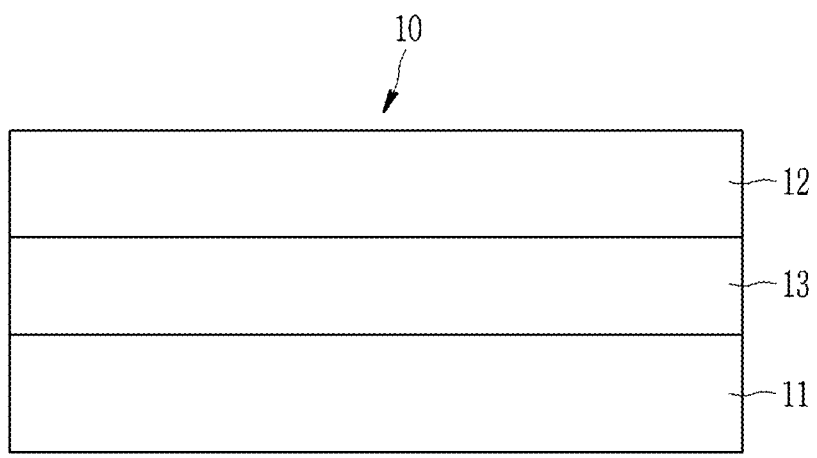
FIG. 1 is a cross-sectional view of a capacitor as an embodiment of a ceramic electronic component.

Hereinafter, embodiments of the disclosure will be described in detail so that a person skilled in the art would understand the same. This disclosure may, however, be embodied in many different forms and is not construed as limited to the embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper,"

depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a ceramic electronic component according to an embodiment is described with reference to drawings.

FIG. 1 is a schematic view of a ceramic electronic component according to an embodiment.

FIG. 1 shows a capacitor 10 as an example of the ceramic electronic component.

Referring to FIG. 1, the capacitor 10 according to an embodiment includes a pair of electrodes 11 and 12 facing each other and a dielectric layer 13.

In an embodiment, the pair of electrodes 11 and 12 includes a conductor such as a metal, for example, nickel (Ni), gold (Au), platinum (Pt), palladium (Pd), copper (Cu), silver (Ag), tin (Sn), an alloy thereof, or a combination thereof, but is not limited thereto. The pair of electrodes 11 and 12 may be, for example, a metal plate, for example, a conductive layer disposed on a substrate (not shown) or a metal plated plate on a substrate (not shown). Herein, the substrate may be, for example, a glass substrate, a semiconductor substrate, a polymer substrate, or a combination thereof.

The dielectric layer 13 is disposed between the pair of electrodes 11 and 12, and the pair of electrodes 11 and 12 is electrically insulated from each other by the dielectric layer 13.

The dielectric layer 13 may include a two dimensional ("2D") nanosheet monolayer film that a plurality of ceramic nanosheets is arranged in a monolayer, and the 2D nanosheet monolayer film may include one layer or two or more layers.

In an embodiment, the ceramic nanosheet (hereinafter, also referred to as 'nanosheet') may be, for example, an exfoliated nanostructure obtained from a bulk ceramic powder having a layered structure. In an embodiment, nanosheet may include a ceramic material having a permittivity of, for example, greater than or equal to about 50, for example, a metal oxide nanosheet, for example, $Ca_2Nb_3O_{10}$, $Ca_2NaNb_4O_{13}$, $Ca_2Na_2Nb_5O_{16}$, $Sr_2Nb_3O_{10}$, $SrBi_4Ti_4O_{15}$, $Ti_2NbO_7$, $LaNb_2O_7$, or a combination thereof, but is not limited thereto.

Each nanosheet may have a thin sheet shape having a predetermined average lateral size (hereinafter, also referred to as 'lateral size'). In an embodiment, the average thickness of nanosheet may be, for example, less than or equal to about 5 nanometers (nm), within the range, for example, less than or equal to about 3 nm, less than or equal to about 2 nm, or less than or equal to about 1.5 nm. In an embodiment, the lateral size of nanosheet may be, for example, about 0.1 μm to 30 μm, within the range, for example, about 0.2 μm to about 20 μm, about 0.3 μm to about 15 μm, or about 0.5 μm to about 10 μm. The lateral size of nanosheet may be determined depending upon the synthesis and exfoliation conditions in the synthesizing and exfoliating bulk ceramic powder.

The dielectric layer 13 may include nanosheets having different lateral size distributions from each other. The lateral size distribution of nanosheets may be expressed by, for example, a continuous probability distribution, and nanosheets according to an embodiment may have a multimodal lateral size distribution expressed by at least two separated peaks.

In an embodiment, it may have a multimodal lateral size distribution including a first peak shown at a lateral size greater than or equal to about 1.5 μm and a second peak separated from the first peak and shown in a lateral size smaller than the lateral size of the first peak, for example.

The multimodal lateral size distribution of the nanosheets may be, for example, a bimodal lateral size distribution or a trimodal lateral size distribution. In an embodiment, the multimodal lateral size distribution of the nanosheets may be a bimodal lateral size distribution, for example.

Figure 2:
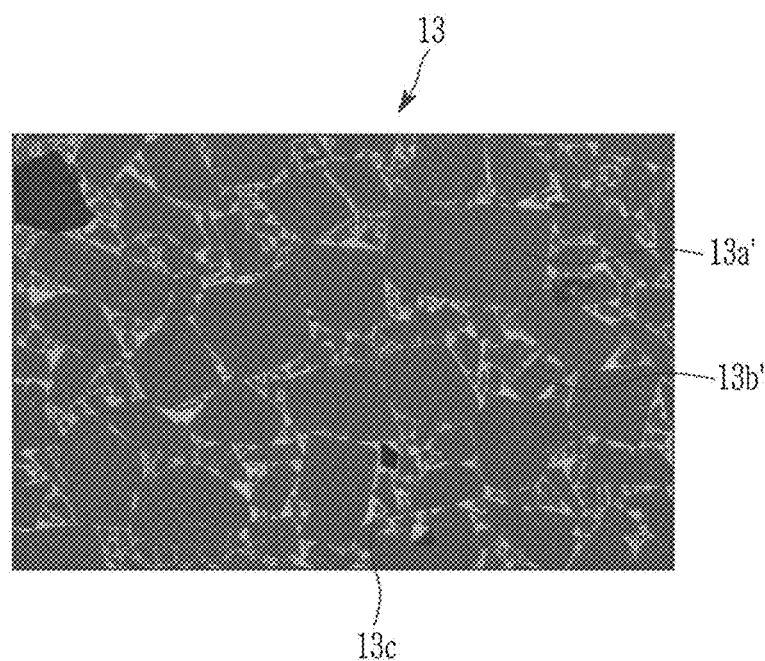
FIG. 2 is a schematic top plan view of to an embodiment of nanosheets of a dielectric layer.

FIG. 2 is a schematic top plan view of nanosheets of a dielectric layer according to an embodiment and FIGS. 3A to 3C are graphs showing one example of a lateral size distribution of the nanosheets of the dielectric layer of FIG. 2.

Referring to FIG. 2, the dielectric layer 13 may have a bimodal lateral size distribution including a first nanosheet group including or consisting of nanosheets 13a' having a distribution of relatively large lateral size and a second nanosheet group including or consisting of nanosheets 13b' having a distribution of a relatively small lateral size. The nanosheets 13a' of the first nanosheet group and the nanosheets 13b' of the second nanosheet group may be randomly arranged. In an embodiment, they are arranged so that nanosheets 13b' of the second nanosheet group having a relatively small lateral size are filled between nanosheets 13a' of the first nanosheet group having a relatively large lateral size, for example. The dielectric layer 13 may also include inevitably generated pores 13c. The pore 13c may be an opened region which is not covered with nanosheets 13a' and 13b' or a gap between nanosheets 13a' and 13b'.

Referring to FIGS. 3A to 3C, nanosheets of the dielectric layer 13 may be obtained by mixing a first nanosheet group having a unimodal lateral size distribution (a) expressed by a first peak P1 with a second nanosheet group having a second unimodal lateral size distribution (b) expressed by a second peak P2.

In an embodiment, the first nanosheet group may show a lateral size distribution $LS_{R1}$ in at least a part of region of, for example, about 1 µm to about 10 µm, for example, the lateral size $LS_{P1}$ in the first peak P1 may be about 1.5 µm to about 10 µm.

In an embodiment, the second nanosheet group may have a smaller average lateral size than that of nanosheets of the first nanosheet group, for example, it may show a lateral size distribution $LS_{R2}$ in at least a part of region of, for example, about 0.01 µm to about 5 µm, and, for example, the lateral size $LS_{P2}$ of the second peak P2 may be less than or equal to about 2.0 µm, within the range, less than or equal to about 1.0 µm.

In an embodiment, the lateral size $LS_{P1}$ at the first peak P1 may be greater than or equal to two times of the lateral size $LS_{P2}$ at the second peak P2, for example, a lateral size ratio ($LS_{P1}:LS_{P2}$) of the first peak P1 and the second peak P2 may be about 2:1 to about 10:1, for example.

In an embodiment, the lateral size $LS_{P1}$ at the first peak P1 may be about 2.0 µm to about 5.0 µm, and the lateral size $LS_{P2}$ at the second peak P2 may be about 0.5 µm to about 1.0 µm, and a lateral size ratio ($LS_{P1}:LS_{P2}$) of the first peak P1 and the second peak P2 may be about 2.4:1 to 6:1, for example, but is not limited thereto.

The first nanosheet group may be included in the dielectric layer 13 at a higher volume ratio than the second nanosheet group, for example, the first nanosheet group may be included at a volume ratio of a greater than or equal to about five times of the second nanosheet group, for example, the first nanosheet group and the second nanosheet group may be included at a volume ratio of about 5:1 to about 100:1, within the range, for example, at a volume ratio of about 5:1 to about 80:1, for example, about 5:1 to about 70:1, for example, about 5:1 to about 50:1, but is not limited thereto.

As the dielectric layer 13 includes nanosheets having different lateral size distributions from each other, nanosheets 13b' of the second nanosheet group having a relatively small lateral size are effectively filled between nanosheets 13a' of the first nanosheet group having a relatively large lateral size, thereby it may effectively decrease pores which are to be inevitably generated in the dielectric layer 13, so may effectively lower a porosity of the dielectric layer 13. The porosity may be defined as a ratio of an area of the opened region where is not covered by nanosheets 13a' and 13b' with respect to the total area of the dielectric layer 13, that is, a ratio of the pore area to the total area of the dielectric layer 13.

The porosity of the dielectric layer 13 may be, for example, less than or equal to about 9.0%, within the range, for example, less than or equal to about 8.8%, for example, less than or equal to about 8.5%, for example, less than or equal to about 8.0%, for example, less than or equal to about 7.5%, or for example, less than or equal to about 7.0%.

The porosity of the dielectric layer 13 may be adjusted depending upon, for example, each lateral size of nanosheets 13a' of the first nanosheet group and the nanosheets 13b' of the second nanosheet group, a lateral size ratio thereof, and a mixing ratio thereof (volume ratio or area ratio).

A thickness of the dielectric layer 13 may be less than or equal to about 0.5 µm, for example, less than or equal to about 0.3 µm, for example, less than or equal to about 0.2 µm, or, less than or equal to about 0.1 µm.

Since the ceramic nanosheet is included in the dielectric layer 13 as in above, the thickness of the dielectric layer 13 may be significantly decreased compared to the case of using the bulk ceramic powder, so that the capacitance of the capacitor may be enhanced. Particularly, the bulk ceramic powder has limits to reduce a thickness of the dielectric layer since the capacitance is rapidly deteriorated according to decreasing the crystal particle size while the dielectric layer 13 including the ceramic nanosheet may accomplish a high capacitance with a thinner thickness without the thickness limit.

In addition, as described above, the dielectric layer 13 includes nanosheets having different lateral size distributions from each other, so the porosity of the dielectric layer 13 may be effectively lowered, so as to further enhance the capacitance of the capacitor.

Figure 3:
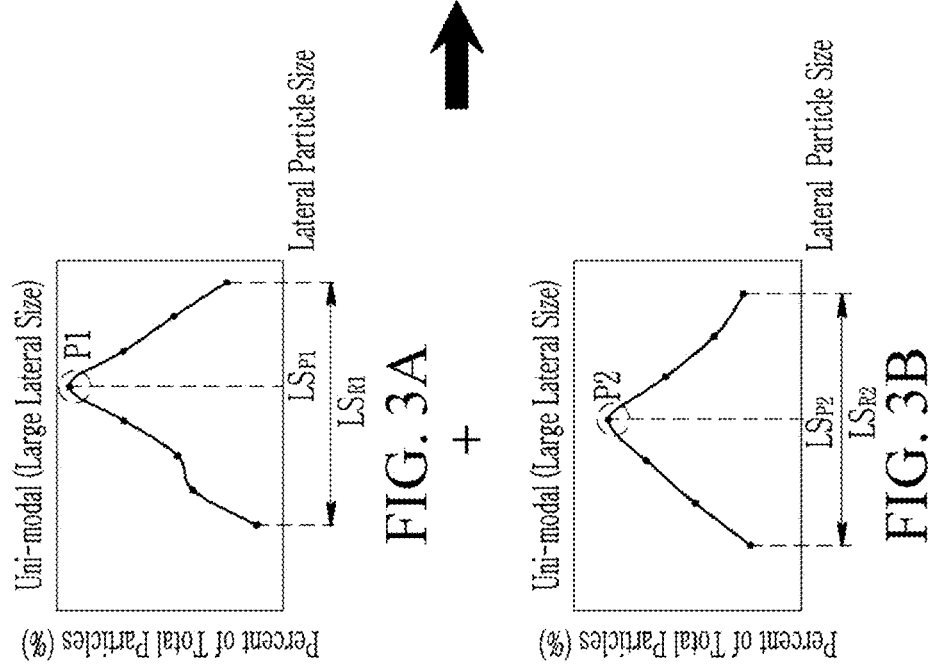
FIGS. 3A to 3C are graphs showing one example of a lateral size distribution of the nanosheets of the dielectric layer of FIG. 2.

Hereinafter, one example of a method of manufacturing the ceramic electronic component shown in FIG. 1 is described with reference to FIGS. 1 to 3.

The method of manufacturing the ceramic electronic component according to an embodiment includes synthesizing a layered ceramic powder, exfoliating the layered ceramic powder to provide a plurality of ceramic nanosheets 13a' and 13b' having different lateral size distributions, forming a plurality of ceramic nanosheets on an electrode 11 to provide a dielectric layer 13, and forming an electrode 12 on the dielectric layer 13.

The layered ceramic powder may be obtained from a layered ceramic material, where the layered ceramic material may be obtained by, for example, heat-treating a mixture including a transition metal oxide and an alkaline metal compound and/or an alkaline-earth metal compound. In an embodiment, the transition metal oxide may include, for example, an oxide including Nb, Sr, Bi, Ti, Re, V, Os, Ru, Ta, Ir, W, Ga, Mo, In, Cr, Rh, Mn, Co, Fe, or a combination thereof, for example, $Nb_2O_5$ or the like, but is not limited thereto. In an embodiment, the alkaline metal compound and/or the alkaline-earth metal oxide may include, for example, a compound including Ca, K, or a combination thereof, for example, $CaCO_3$, $K_2CO_3$, or the like, but is not limited thereto. The mixing ratio of the transition metal oxide and the alkaline metal compound and/or the alkaline-earth metal compound may be appropriately chosen considering a composition of the ceramic material to be obtained, for example, about 0.1 mol to about 1 mol of the alkaline metal compound and/or the alkaline-earth metal compound may be mixed per about 1 mol of the transition metal oxide, but is not limited thereto. The heat treatment may be performed, for example, at about 750 degrees Celsius (° C.) to about 1500° C. for about 10 hours to about 50 hours under an air atmosphere, a nitrogen atmosphere, an argon atmosphere, or a vacuum, but is not limited thereto.

The layered ceramic material may be ground to obtain a layered ceramic powder.

The layered ceramic powder may be exfoliated in various ways, for example, it may be exfoliated by a sequential ion exchange of an organic cation, a protonic acid using an osmotic pressure phenomenon, and an intercalation reaction.

In an embodiment, the layered ceramic powder is acid-exchanged with an acidic solution such as hydrochloric acid, sulfuric acid to obtain a layered proton-exchanged ceramic powder in which at least one part of the alkaline metal is substituted with proton ($H^+$), for example. A concentration, a treatment temperature, and a treatment time or the like may be appropriately selected, but are not particularly limited.

Subsequently, the obtained layered proton exchange ceramic powder is intercalated to provide an intercalated layered ceramic powder. In an embodiment, the intercalation may be performed using, for example, a C1 to C20 alkylammonium salt compound as an intercalant, but is not limited thereto. In an embodiment, the alkylammonium salt compound may include, for example, a tetramethylammonium compound such as tetramethylammonium hydroxide, a tetraethyl ammonium compound such as tetraethylammonium hydroxide, a tetrapropylammonium compound such as tetrapropylammonium hydroxide, a tetrabutylammonium compound such as tetrabutylammonium hydroxide and/or a benzylalkylammonium compound such as benzylmethylammonium hydroxide, but is not limited thereto.

The alkylammonium salt compound may be provided in a form of an aqueous solution, and the alkylammonium salt aqueous solution may have a concentration about 0.01 mol % to about 20 mol % based on the proton of the layered proton exchange ceramic powder, but is not limited thereto. In an embodiment, the temperature and the time for the intercalation are not particularly limited, but it may be performed, for example, at about 25° C. to about 80° C. for about one day to about five days, but is not limited thereto. The intercalant is inserted between layers of the layered proton exchange ceramic powder to help to be separated into ceramic nanosheets. For the effectively exfoliation, a centrifuge, an ultrasonic wave, or a combination thereof may be performed.

The ceramic nanosheet exfoliated from the layered ceramic powder may be a monocrystal ceramic nanosheet and stably dispersed in a solvent to be in a colloidal form. The solvent may be, for example, a solvent having a high permittivity, for example, water or a polar solvent, and may be, for example, water, alcohol, acetonitrile, dimethyl sulfoxide, dimethyl formamide, propylenecarbonate, or a combination thereof, but is not limited thereto.

For preparing the ceramic nanosheets, a plurality of ceramic nanosheets having different lateral size distributions is each prepared, and then they are mixed. In an embodiment, the preparing the ceramic nanosheets may include preparing a first nanosheet group including nanosheets $13a'$ having a relatively large lateral size distribution, preparing a second nanosheet group including nanosheets $13b'$ having a relatively small lateral size distribution, and mixing the first nanosheet group and the second nanosheet group, for example. Nanosheets $13a'$ for the first nanosheet group may show a lateral size distribution in a region of at least a part of about 1 μm to about 10 μm and may have a first peak P1 shown in a lateral size $LS_{P1}$ greater than or equal to about 1.5 μm, and nanosheets $13b'$ for the second nanosheet group may have an average lateral size smaller than the first ceramic nanosheet group and a second peak P2 shown in a lateral size $LS_{P2}$ which is smaller than the first peak.

A lateral size of the ceramic nanosheet may be adjusted in various ways. In an embodiment, the lateral size of the ceramic nanosheet may be adjusted depending upon a heat treatment temperature and/or a heat treatment time during preparing the layered ceramic material or the layered ceramic powder, for example, the larger lateral size of nanosheets may be obtained as it is heated at the higher temperature. In an embodiment, the lateral size of the ceramic nanosheet may be adjusted depending upon the centrifuge condition in the exfoliating the layered ceramic powder. In an embodiment, the larger lateral size of nanosheets may be obtained as it is centrifuged at the slower speed. Accordingly, for example, in the preparing a first nanosheet group including or consisting of nanosheets $13a'$, it may be heated at a higher temperature than in the step of preparing the second nanosheet group including or consisting of nanosheets $13b'$, or it may be centrifuged at a slower speed.

The first nanosheet group and the second nanosheet group may be mixed each in a form of being dispersed in a solvent, and the first nanosheet group and the second nanosheet group may be mixed at a volume ratio of, for example, about 5:1 to about 100:1, for example, about 5:1 to about 80:1, for example, about 5:1 to about 70:1, or for example, about 5:1 to about 50:1, but is not limited thereto.

The ceramic nanosheet solution including a plurality of ceramic nanosheets may be coated on an electrode 11 according to a solution process to provide a 2D nanosheet monolayer. It may coated according to, for example, a Langmuir-Blodgett method, a Layer-by-Layer method, a spin coating, a slit coating, a bar coating, or a dip coating. The coating may be performed for one time or two or more times, and a plurality of 2D nanosheet monolayers may be obtained by performing the coating for two or more times.

Hereinafter, the ceramic electronic component according to another embodiment is described.

Figure 4:
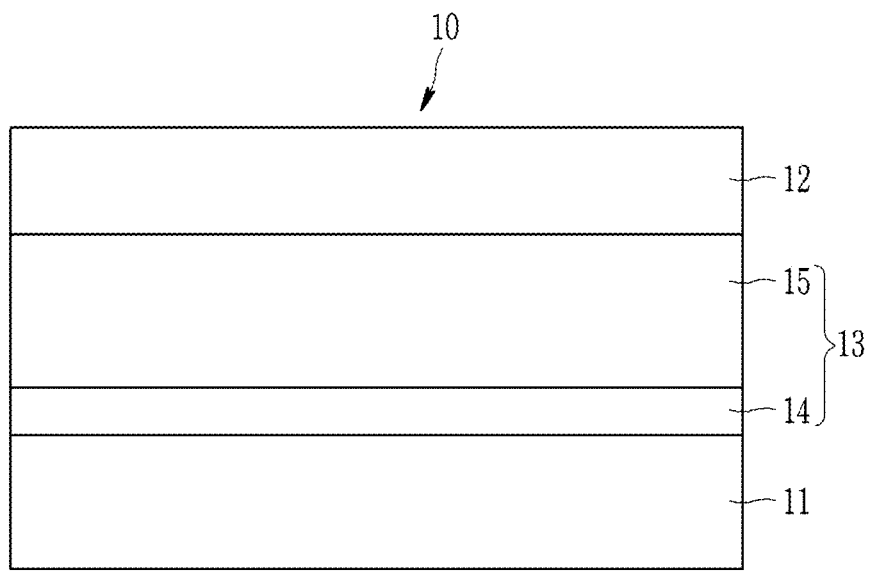
FIG. 4 is a schematic view of another embodiment of a ceramic electronic component.

FIG. 4 is a schematic view of a ceramic electronic component according to another embodiment.

Referring to FIG. 4, the ceramic electronic component according to another embodiment includes a pair of electrodes 11 and 12 facing each other and a dielectric layer 13 disposed between the pair of electrode 11 and 12, as in the above embodiment.

However, in the ceramic electronic component according to this embodiment, the dielectric layer 13 includes a first dielectric layer 14 including a plurality of ceramic nanosheets and a second dielectric layer 15 including a ceramic bulk dielectric layer, unlike the above embodiment.

The first dielectric layer 14 may include the plurality of nanosheets, which may be an exfoliated structure obtained from the bulk ceramic powder having a layered structure, as described above, and may include a 2D nanosheet monolayer film that a plurality of nanosheets are arranged in a monolayer. The details are the same as described above.

The second dielectric layer 15 may include a bulk dielectric layer which is not exfoliated. In an embodiment, the bulk dielectric layer may be a metal oxide having a permittivity of, for example, greater than or equal to about 100, for example, a metal oxide including barium (Ba), strontium (Sr), and/or titanium (Ti), for example, $BaTiO_3$, $SrTiO_3$, or $Ba_{0.5}Sr_{0.5}TiO_3$, but is not limited thereto.

The first dielectric layer 14 may be disposed under or on the second dielectric layer 15 and may be thinner than the second dielectric layer 15. In an embodiment, a thickness of the first dielectric layer 14 may be less than or equal to about 10 nm, for example, less than or equal to about 8 nm, less than or equal to about 5 nm, or less than or equal to about 3 nm. In an embodiment, a thickness of the first dielectric layer 14 may be about 0.5 nm to about 10 nm, for example, about 0.5 nm to about 8 nm, about 1 nm to about 5 nm, or about 1 nm to about 3 nm. In an embodiment, the first dielectric layer 14 may be a monolayered 2D nanosheet monolayer film. In an embodiment, a thickness of the second dielectric layer 15 may be less than or equal to about 10 µm, for example, less than or equal to about 5 µm, less than or equal to about 3 µm, or less than or equal to about 2 µm. In an embodiment, a thickness of the second dielectric layer 15 may be about 0.01 µm to about 10 µm, for example, about 0.01 µm to about 5 µm, about 0.01 µm to about 3 µm, or about 0.01 µm to about 2 µm.

Like this, as the first dielectric layer 14 including nanosheets on or under the second dielectric layer 15 is formed, it may decrease a dead layer effect which may be occurred at the interface between the second dielectric layer 15 employed with the bulk dielectric layer having a high permittivity and electrodes 11, 12, so as to further improve a permittivity.

Figure 5:
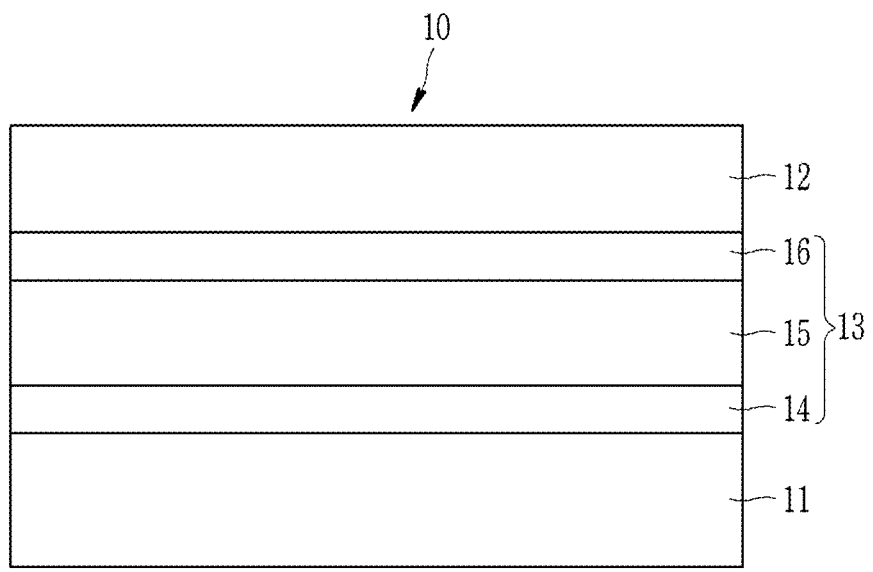
FIG. 5 is a schematic view of another example embodiment of a ceramic electronic component.

FIG. 5 is a schematic view of a ceramic electronic component according to further another example embodiment.

Referring to FIG. 5, the ceramic electronic component according to further another embodiment includes a pair of electrodes 11 and 12 facing each other and a dielectric layer 13 disposed between the pair of electrodes 11 and 12.

However, in the ceramic electronic component according to this embodiment, the dielectric layer 13 includes a first dielectric layer 14 including a plurality of ceramic nanosheets, a second dielectric layer 15 including a bulk dielectric layer, and a third dielectric layer 16 including a plurality of ceramic nanosheets.

The first dielectric layer 14 and the third dielectric layer 16 may include the plurality of nanosheets, which may be exfoliated structures obtained from the bulk ceramic powder having a layered structure, as described above, and may include the 2D nanosheet monolayer film that the plurality of nanosheets is arranged in a monolayer. Details are the same as described above.

The second dielectric layer 15 may include a ceramic bulk dielectric layer which is not exfoliated. In an embodiment, the ceramic bulk dielectric layer may be a metal oxide having a permittivity of, for example, greater than or equal to about 100, for example, a metal oxide including barium (Ba), strontium (Sr), and/or titanium (Ti), for example, $BaTiO_3$, $SrTiO_3$, or $Ba_{0.5}Sr_{0.5}TiO_3$ but is not limited thereto.

The first dielectric layer 14 may be disposed under the second dielectric layer 15, and the third dielectric layer 16 may be disposed on the second dielectric layer 15, and each of the first dielectric layer 14 and the third dielectric layer 16 may be thinner than the second dielectric layer 15. In an embodiment, each thickness of the first dielectric layer 14 and the third dielectric layer 16 may be less than or equal to about 10 nm, for example, less than or equal to about 8 nm, less than or equal to about 5 nm, or less than or equal to about 3 nm. In an embodiment, each thickness of the first dielectric layer 14 and the third dielectric layer 16 may be about 0.5 nm to about 10 nm, for example, about 0.5 nm to about 8 nm, about 1 nm to about 5 nm, or about 1 nm to about 3 nm. In an embodiment, each of the first dielectric layer 14 and the third dielectric layer 16 may be a monolayered 2D nanosheet monolayer film. In an embodiment, a thickness of the second dielectric layer 15 may be less than or equal to about 10 µm, for example, less than or equal to about 5 µm, less than or equal to about 3 µm, or less than or equal to about 2 µm. In an embodiment, a thickness of the second dielectric layer 15 may be about 0.01 µm to about 10 µm, for example, about 0.01 µm to about 5 µm, about 0.01 µm to about 3 µm, or about 0.01 µm to about 2 µm.

As the first dielectric layer 14 and the third dielectric layer 16 including nanosheets are each formed on and under the second dielectric layer 15, the dead layer effect which may be occurred at interfaces between the second dielectric layer 15 employed with the ceramic bulk dielectric layer having a high permittivity and electrodes 11 and 12 may be decreased, so that the permittivity may be further improved.

Figure 6:
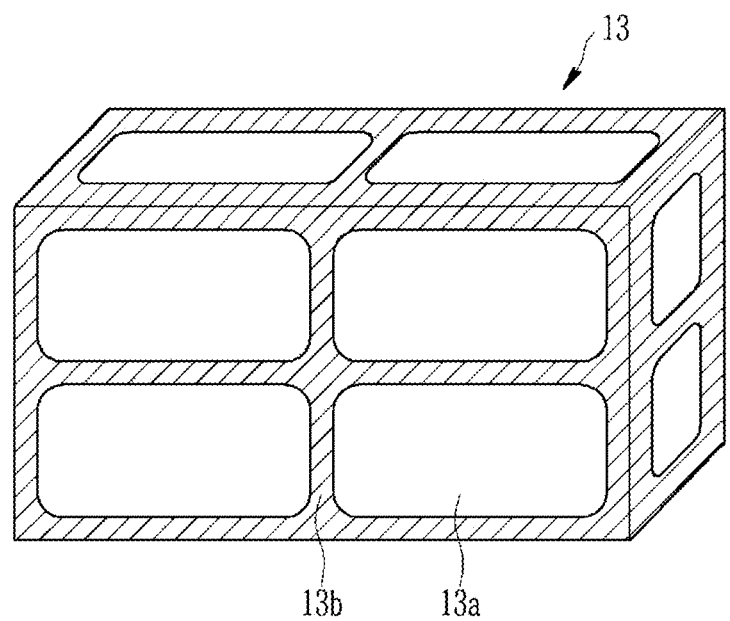
FIG. 6 is a schematic perspective view of another example embodiment of a ceramic electronic component.
Figure 7:
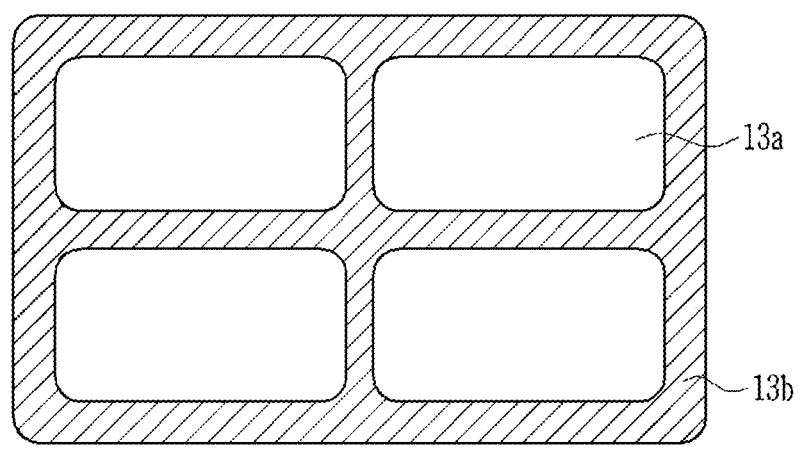
FIG. 7 is a cross-sectional view schematically showing a cross-sectional surface of a dielectric layer of the ceramic electronic component shown in FIG. 6, FIGS. 8 and 9 are schematic cross-sectional views showing various embodiments of structures of the dielectric layer of the electronic component shown in FIG. 6.

FIG. 6 is a perspective view schematically showing a part of ceramic electronic component according to further yet another embodiment, and FIG. 7 is a cross-sectional view schematically showing a cross-sectional surface of the dielectric layer of the ceramic electronic component shown in FIG. 6.

The ceramic electronic component according to this embodiment includes a pair of electrodes 11 and 12 facing each other and a dielectric layer 13 disposed between the pair of electrode 11 and 12 as in the above embodiment.

However, the dielectric layer 13 of the ceramic electronic component according to this embodiment may include a plurality of grains 13a and a grain boundary 13b surrounding the grain 13a as shown in FIGS. 6 and 7. Although a part of the dielectric layer 13 is schematically shown in the drawings, the plurality of grains 13a surrounded with the grain boundary 13b may be disposed along with rows and/or columns, or the plurality of grains 13a surrounded by the grain boundary 13b may be disposed in random.

In an embodiment, the grain 13a may be a 3-dimensional bulk dielectric material which is not exfoliated, for example, it may include a metal oxide having a permittivity greater than or equal to about 100, for example, a metal oxide including barium (Ba), strontium (Sr) and/or titanium (Ti), for example, barium titanite, strontium titanite, barium strontium titanite, lead titanate, lead zirconate, lead zirconate titanate, or a combination thereof, but is not limited thereto.

The grain 13a may further include a donor element and/or an acceptor element on the bulk dielectric material. The donor element and/or the acceptor element may be, for example, a metal element or metalloid, and the donor element may be, for example, La, Sm, Dy, Ho, Y, Nd, Ce, Nb, Ta, W, or a combination thereof; and the acceptor element may be, for example, Mn, Co, Ni, Cr, or a combination thereof, but is not limited thereto. The bulk dielectric material may have oxygen vacancy, and the donor element and/or the acceptor element may be solid-dissolved in the bulk dielectric material. As in above, by further including the donor element and/or the acceptor element on the bulk dielectric material, the electric characteristic of the bulk dielectric material may be changed to effectively obtain semi-conductivity, conductivity or insulation.

An average particle diameter of the grain 13a may be variously determined considering an apparent relative permittivity of a capacitor, and may be, for example, less than or equal to about 1.5 µm, less than or equal to about 1.4 µm, less than or equal to about 1.3 µm, less than or equal to about 1.2 µm, less than or equal to about 1.1 µm, less than or equal to about 1.0 µm, less than or equal to about 900 nm, less than or equal to about 800 nm, less than or equal to about 700 nm, less than or equal to about 600 nm, less than or equal to about 500 nm, or less than or equal to about 300 nm, and, for example, greater than or equal to about 50 nm, greater than or equal to about 60 nm, greater than or equal to about 70 nm, greater than or equal to about 80 nm, greater than or equal to about 90 nm, or greater than or equal to about 100 nm, but is not limited thereto.

The grain boundary 13b may include a single layer of the 2D nanosheet that a plurality of ceramic nanosheets is arranged in one layer or two or more layers. The ceramic nanosheet may be an exfoliated structure obtained from the bulk ceramic powder as described above, and may have a multimodal lateral size distribution expressed by at least two separated peaks as described above. The details of the ceramic nanosheet and the 2D nanosheet monolayer film are the same as described above.

In an embodiment, the grain boundary 13b may be directly contacted with the grain 13a, or at least a part of the grain boundary 13b may be spaced apart from the grain 13a, for example. In an embodiment, the grain boundary 13b may surround the whole of the grain 13a or may surround a part of the grain 13a, for example.

A thickness of the grain boundary 13b may be less than the thickness of the grain 13a, and may be, for example, less than or equal to about 100 nm, less than or equal to about 80 nm, less than or equal to about 70 nm, less than or equal to about 50 nm, less than or equal to about 30 nm, less than or equal to about 20 nm, less than or equal to about 10 nm, or less than or equal to about 5 nm, but is not limited thereto.

Since a capacitance is formed in the grain boundary 13b disposed between adjacent grains 13a when applying a predetermined voltage to the adjacent grain 13a, the ceramic electronic component according to this embodiment may effectively function as a capacitor.

Figure 8:
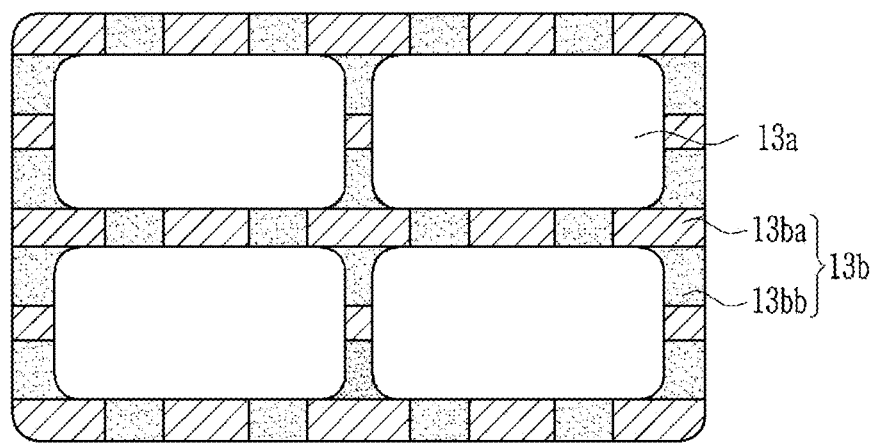
Figure 9:
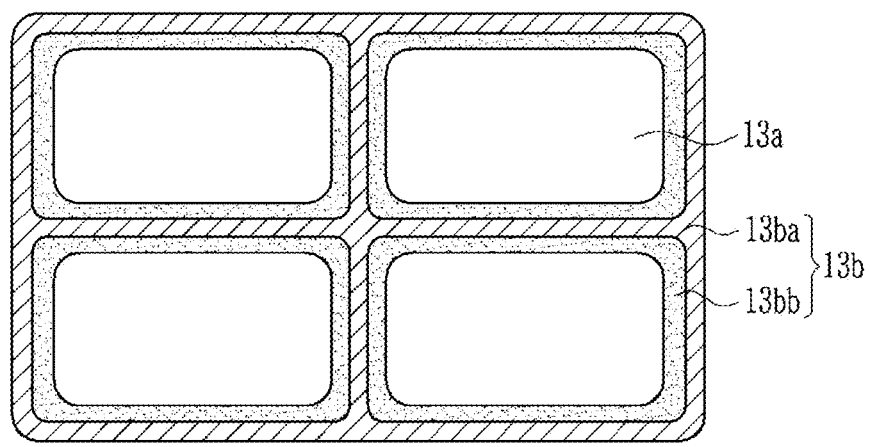

In addition, a plurality of grains 13a surrounded with the grain boundary 13b is arranged along with a row and a column or disposed in random to connect in serial and/or parallel, so that it may effectively function as a capacitor having a high capacitance overall. FIGS. 8 and 9 are schematic cross-sectional views showing the various structures of the dielectric layer of the ceramic electronic component shown in FIG. 6.

Referring to FIGS. 8 and 9, the dielectric layer 13 (refer to FIG. 6) may include a plurality of grains 13a surrounded with a grain boundary 13b, and the grain boundary 13b may further include a bulk dielectric material in addition to the plurality of ceramic nanosheets.

In an embodiment, the grain boundary 13b may include a region 13ba including ceramic nanosheets and a region 13bb including a bulk dielectric material, for example, as shown in FIG. 8, the region 13ba including the ceramic nanosheets and the region 13bb including the bulk dielectric material may be incontinuously repeated and disposed, or for example, as shown in FIG. 9, the region 13ba including the ceramic nanosheets and the region 13bb including the bulk dielectric material may be disposed in a continuous strip shape. However, the region 13ba including the ceramic nanosheets and the region 13bb including the bulk dielectric material may be dispose in various ways, and are not limited by the aforementioned embodiment.

Figure 10:
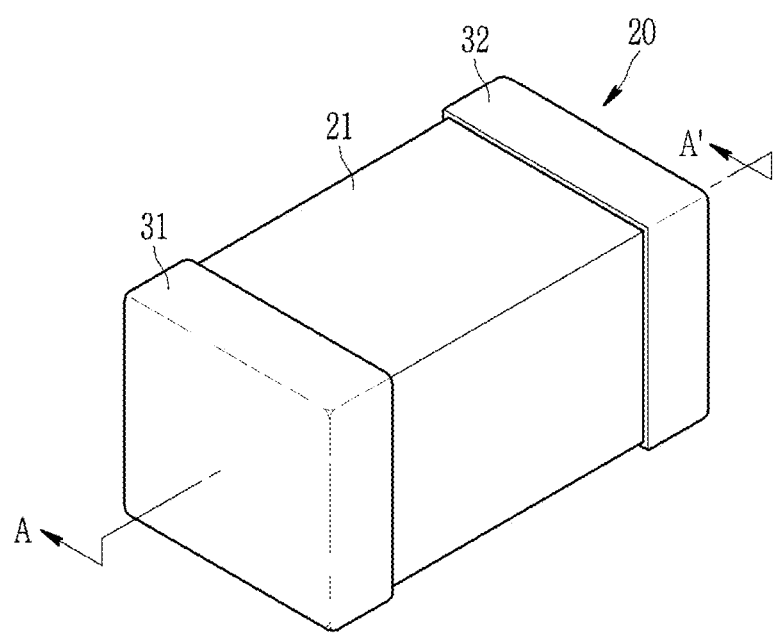
FIG. 10 is a perspective view schematically showing another example embodiment of a ceramic electronic component.
Figure 11:
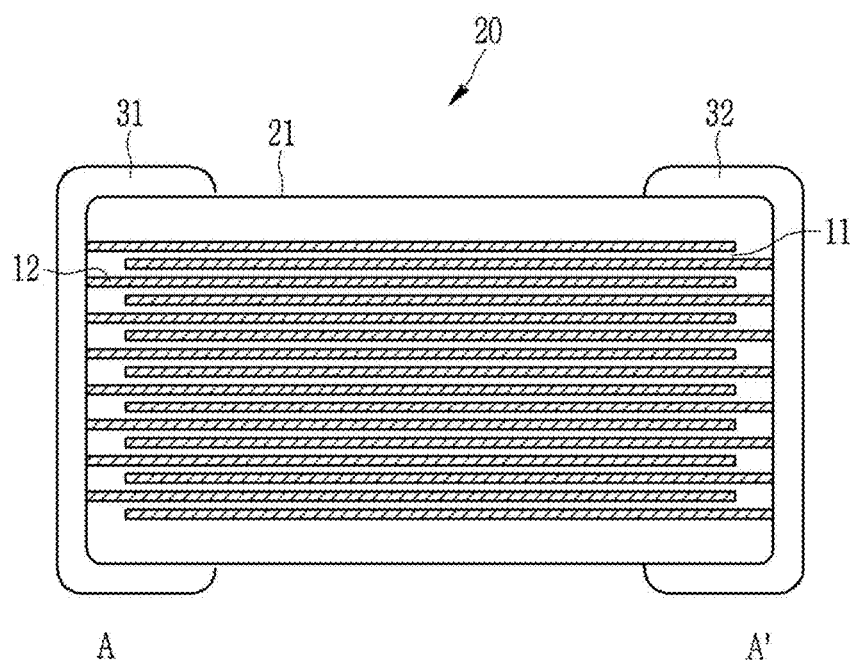
FIG. 11 is a cross-sectional view of the ceramic electronic component shown in FIG. 10 taken along line A-A'.

FIG. 10 is a perspective view schematically showing a ceramic electronic component according to another embodiment, and FIG. 11 is a cross-sectional view showing the ceramic electronic component of FIG. 10 cut along line A-A'.

The ceramic electronic component according to this embodiment is a multi-layer ceramic capacitor ("MLCC") 20 having a structure in which a unit capacitor of the capacitor shown in FIG. 1 is laminated in plural.

Referring to FIGS. 10 and 11, an MLCC 20 includes a capacitor body 21 and external electrodes 31 and 32. The capacitor body 21 has a structure that a plurality of capacitors 10 shown in FIG. 1, 4, or 5 is laminated, and each capacitor includes electrodes (internal electrodes) 11 and 12 and a dielectric layer 13 (refer to FIG. 1), as in above. The details are the same as described above.

As one example of the ceramic electronic component, a capacitor and an MLCC are described above, but are not limited thereto, and it may be applied for all electronic components using ceramic.

The ceramic electronic component such as the capacitor and the multi-layer ceramic capacitor may be included in a variety of electronic devices, for example, may be employed for an image device such as a liquid crystal display ("LCD"), a computer, and a mobile phone, or the like.

Hereinafter, the embodiments are illustrated in more detail with reference to examples. However, these examples are exemplary and the scope of the disclosure is not limited thereto.

Synthesis Example I: Synthesis of $KCa_2Nb_3O_3$ Ceramic Powder (Mother Phase)

Synthesis Example 1

$K_2CO_3:CaCO_3:Nb_2O_5$ is prepared in a composition rate of 1.1:2:3. Subsequently, the powder is added into ethanol and uniformly mixed using a ball mill for 24 hours. Subsequently, the mixed powder is dried while mixing the same in a beaker using a magnetic bar and a hot plate. For the sufficient dry, it is further dried in an oven at 100° C. for one day. Subsequently, it is calcinated under the air atmosphere at 1200° C. for 10 hours to provide a $KCa_2Nb_3O_{10}$ mother phase.

Synthesis Example 2

A $KCa_2Nb_3O_{10}$ mother phase is synthesized in accordance with the same procedure as in Synthesis Example 1, except calcinating the same at 1300° C. for 10 hours.

[Preparation of Nanosheet Solution]

Synthesis Example 3

5 g of the $KCa_2Nb_3O_{10}$ mother phase obtained from Synthesis Example 1 is added into 200 cm$^3$ of a $HNO_3$ aqueous solution having a 5M concentration to substitute a potassium ion ($K^+$) with hydrogen ($H^+$) for 72 hours. Subsequently, it is neutralized using distilled water and sufficiently dried under the air and fully dried in an oven for one day or longer. Subsequently, 0.4 g of hydrogen-substituted $HCa_2Nb_3O_{10} \cdot 1.5H_2O$ is mixed in a tetrabutylammonium hydroxide solution ("TBAOH") to substitute $H^+$ with TBA and exfoliated to nanosheets during being substituted with TBA on the layer. In this case, $HCa_2Nb_3O_{10} \cdot 1.5H_2O$ and TBAOH are mixed at a ratio of 1:1. The exfoliation is performed by mechanically shaking the same at 150 revolutions per minute (rpm) at a room temperature for 7 days. Subsequently, after removing a precipitate in the bottom of the beaker, it is centrifuged at 2,000 rpm for 30 minutes using a centrifugal separator, and then only supernatant (⅔) is used, and the settled residue is discarded. Subsequently, the centrifuged supernatant is dialyzed using a membrane to remove a tetrabutylammonium aqueous solution, so that a nanosheet solution including nanosheets having a lateral size of about 3.2 μm is obtained.

Synthesis Example 4

A nanosheet solution is prepared in accordance with the same procedure as in Synthesis Example 3, except that it is centrifuged at 6,000 rpm for 30 minutes.

Synthesis Example 5

A nanosheet solution is prepared in accordance with the same procedure as in Synthesis Example 3, except that it is centrifuged at 11,000 rpm for 30 minutes.

Synthesis Example 6

A nanosheet solution is prepared in accordance with the same procedure as in Synthesis Example 3, except that it is exfoliated at 100 rpm (mild shaking).

Synthesis Example 7

A nanosheet solution is prepared in accordance with the same procedure as in Synthesis Example 3, except that the $KCa_2Nb_3O_{10}$ mother phase obtained from Synthesis Example 2 instead of the $KCa_2Nb_3O_{10}$ mother phase obtained from Synthesis Example 1.

[Evaluation I]

Nanosheets included in the nanosheet solutions according to Synthesis Examples 3 to 7 are monitored for a lateral size distribution.

The lateral size distribution of nanosheets included in the nanosheet solution is measured by obtaining an image thereof using a scanning electron microscope (SEM, Hitachi) and monitoring the same by an image analyzer (software: Image Pro, manufacturer: Media Cybernetics).

Figure 12:
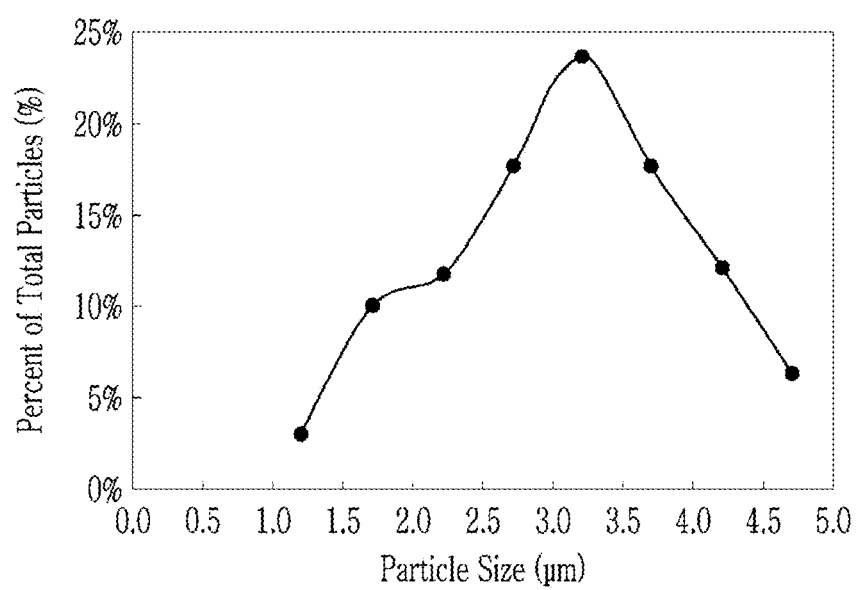
FIG. 12 and FIG. 13 are graphs showing a lateral size distribution of nanosheets distributed in the nanosheet solutions obtained from Synthesis Examples 3 and 4.
Figure 13:
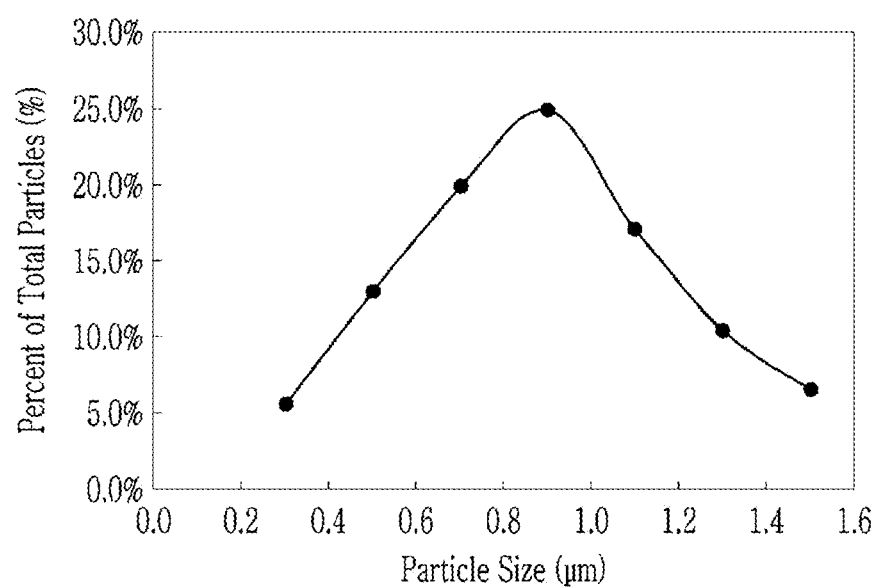

The results are shown in Table 1 and FIGS. 12 and 13.

FIGS. 12 and 13 are graphs showing a lateral size distribution of nanosheets dispersed in the nanosheet solutions obtained from Synthesis Examples 3 and 4.

TABLE 1

| | Ranges of lateral size distribution | Peak |
|---|---|---|
| Synthesis Example 3 | about 1.0 μm to 5.0 μm | about 3.2 μm |
| Synthesis Example 4 | about 0.3 μm to 1.6 μm | about 0.9 μm |
| Synthesis Example 5 | about 0.2 μm to 1.3 μm | about 0.7 μm |
| Synthesis Example 6 | about 1.8 μm to 5.6 μm | about 3.8 μm |
| Synthesis Example 7 | about 2.0 μm to 6.2 μm | about 4.2 μm |

Referring to FIG. 12, it is confirmed that the nanosheet solution obtained from Synthesis Example 3 has a distribution that nanosheets having a lateral size of about 3.2 μm are predominantly included in a region between about 1.0 μm to about 5.0 μm.

Referring to FIG. 13, it is confirmed that nanosheets solution obtained from Synthesis Example 4 has a distribution that nanosheets having a lateral size of about 0.9 μm are predominantly included in a region between about 0.3 μm to about 1.6 μm.

Example I

Example 1-1

A Pt electrode is formed on a Si substrate laminated with $SiO_2$ and $TiO_2$ in a thickness of 200 nm according to a sputtering to provide a lower electrode. Subsequently, the nanosheet solution obtained from Synthesis Example 3 and the nanosheet solution obtained from Synthesis Example 4 are mixed at a volume ratio of 5:1 to provide a mixed nanosheet solution, and the mixed nanosheet solution is coated on the lower electrode according to Langmuir-Blodgett method (KSV NIMA) at a speed of rising the substrate of 0.5 millimeter per minute (mm/min) to provide a 2D nanosheet monolayer. Subsequently, the remaining polymer is removed by supplying ultraviolet ("UV"), and then it is dried in an oven. Subsequently, the coating and the drying are repeated for further 9 times to provide a dielectric layer (0.4×0.2 mm²) including 10-layered 2D nanosheet monolayers. Subsequently, a Pt electrode is formed on the dielectric layer to provide a capacitor.

Figure 14:
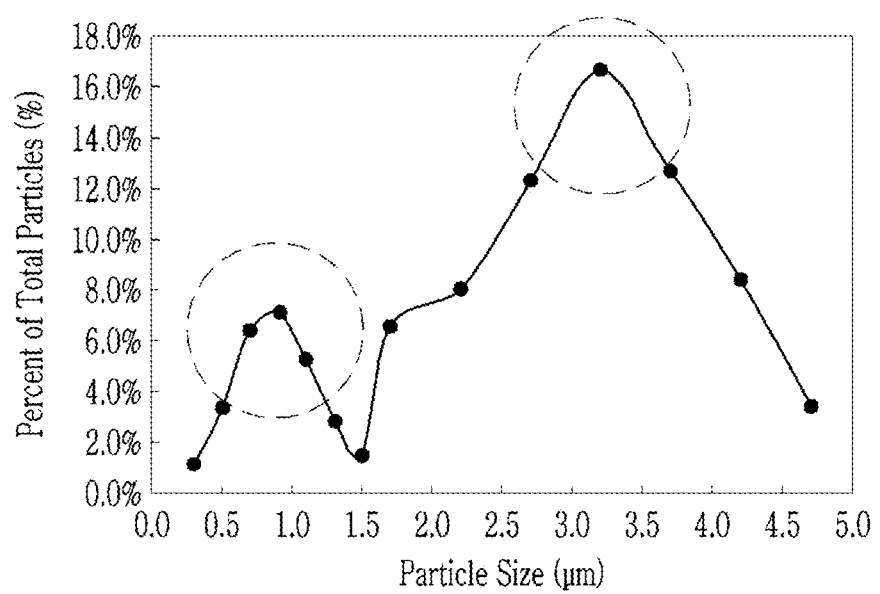
FIG. 14 is a graph showing each lateral size distribution of nanosheets in the capacitor according to Example 1-1.

FIG. 14 is a graph showing a lateral size distribution of nanosheets in the capacitor according to Example 1-1.

Example 1-2

A capacitor is fabricated in accordance with the same procedure as in Example 1-1, except that the 2D nanosheet monolayer is prepared by a mixed solution that the nanosheet solution obtained from Synthesis Example 3 and the nanosheet solution obtained from Synthesis Example 4 are mixed at a volume ratio of 15:1.

Example 1-3

A capacitor is fabricated in accordance with the same procedure as in Example 1-1, except that the 2D nanosheet monolayer is prepared by a mixed solution that the nanosheet solution obtained from Synthesis Example 3 and the nanosheet solution obtained from Synthesis Example 4 are mixed at a volume ratio of 30:1.

Example 1-4

A capacitor is fabricated in accordance with the same procedure as in Example 1-1, except that the 2D nanosheet monolayer is prepared by a mixed solution that the nanosheet solution obtained from Synthesis Example 3 and the nanosheet solution obtained from Synthesis Example 4 are mixed at a volume ratio of 50:1.

Comparative Example 1

A capacitor is fabricated in accordance with the same procedure as in Example 1-1, except that the 2D nanosheet monolayer is prepared using only the nanosheet solution obtained from Synthesis Example 3.

Example 2-1

A Pt electrode is formed on a Si substrate laminated with $SiO_2$ and $TiO_2$ in a thickness of 200 nm according to a sputtering to provide a lower electrode. Subsequently, the nanosheet solution obtained from Synthesis Example 6 and the nanosheet solution obtained from Synthesis Example 4 are mixed at a volume ratio of 10:1 to provide a mixed nanosheet solution, and the mixed nanosheet solution is coated on the lower electrode according to Langmuir-Blodgett method (KSV NIMA) at a speed of rising the substrate of 0.5 mm/min to provide a 2D nanosheet monolayer. Subsequently, the remaining polymer is removed by supplying UV, and it is dried in an oven. Subsequently, the coating and the drying are repeated for further 9 times to provide a dielectric layer including total 10 layers of 2D nanosheet monolayers. Subsequently, a Pt electrode is formed on the dielectric layer to provide a capacitor.

Example 2-2

A capacitor is fabricated in accordance with the same procedure as in Example 2-1, except that the 2D nanosheet monolayer is prepared using a mixed solution that the nanosheet solution obtained from Synthesis Example 6 and the nanosheet solution obtained from Synthesis Example 4 are mixed at a volume ratio of 20:1.

Example 2-3

A capacitor is fabricated in accordance with the same procedure as in Example 2-1, except that the 2D nanosheet monolayer is prepared using a mixed solution that the nanosheet solution obtained from Synthesis Example 6 and the nanosheet solution obtained from Synthesis Example 4 are mixed at a volume ratio of 40:1.

Comparative Example 2

A capacitor is fabricated in accordance with the same procedure as in Example 2-1, except that the 2D nanosheet monolayer is prepared using only the nanosheet solution obtained from Synthesis Example 6.

Example 3-1

A Pt electrode is formed on a Si substrate laminated with $SiO_2$ and $TiO_2$ according to a sputtering in a thickness of 200 nm to provide a lower electrode. Subsequently, the nanosheet solution obtained from Synthesis Example 7 and the nanosheet solution obtained from Synthesis Example 5 are mixed at a volume ratio of 20:1 to provide a mixed nanosheet solution, and the mixed nanosheet solution is coated on the lower electrode according to Langmuir-Blodgett method (KSV NIMA) at a speed of rising the substrate of 0.5 mm/min to provide a 2D nanosheet monolayer. Subsequently, the remaining polymer is removed by supplying UV, and then it is dried in an oven. Subsequently, the coating and the drying are repeated for further 9 times to provide a dielectric layer including total 10 layers of 2D nanosheet monolayers. Subsequently, a Pt electrode is formed on the dielectric layer to provide a capacitor.

Example 3-2

A capacitor is fabricated in accordance with the same procedure as in Example 3-1, except that the 2D nanosheet monolayer is prepared by a mixed solution that the nanosheet solution obtained from Synthesis Example 7 and the nanosheet solution obtained from Synthesis Example 5 are mixed at a volume ratio of 40:1.

Example 3-3

A capacitor is fabricated in accordance with the same procedure as in Example 3-1, except that the 2D nanosheet monolayer is prepared by a mixed solution that the nanosheet solution obtained from Synthesis Example 7 and the nanosheet solution obtained from Synthesis Example 5 are mixed at a volume ratio of 60:1.

Comparative Example 3

A capacitor is fabricated in accordance with the same procedure as in Example 3-1, except that the 2D nanosheet monolayer is prepared using only the nanosheet solution obtained from Synthesis Example 7.

[Evaluation III]

A porosity and a capacitance of each capacitor according to Examples 1-1 to 3-3 and Comparative Examples 1 to 3 are evaluated.

The porosity is evaluated by obtaining an image by a scanning electron microscope (SEM, Hitachi) and measuring the same by an image analyzer (software: Image Pro, manufacturer: Media Cybernetics), a capacitance is evaluated by a LCR meter (Agilent).

The results are shown in Tables 2 to 4.

TABLE 2

| | $LS_{P1}$ (μm) | $LS_{P2}$ (μm) | $LS_{P1}/LS_{P2}$ | Mixing ratio (v:v) | Porosity (%) | Capacitance (nF) |
|---|---|---|---|---|---|---|
| Example 1-1 | 3.2 | 0.9 | 3.56 | 5:1 | 7.9 | 1.58 |
| Example 1-2 | | | | 15:1 | 6.8 | 1.95 |
| Example 1-3 | | | | 30:1 | 8.3 | 1.45 |
| Example 1-4 | | | | 50:1 | 8.8 | 1.40 |
| Comparative Example 1 | | — | — | | 9.1 | 1.32 |

TABLE 3

| | $LS_{P1}$ (μm) | $LS_{P2}$ (μm) | $LS_{P1}/LS_{P2}$ | Mixing ratio (v:v) | Porosity (%) | Capacitance (nF) |
|---|---|---|---|---|---|---|
| Example 2-1 | 3.8 | 0.9 | 4.22 | 10:1 | 7.0 | 1.85 |
| Example 2-2 | | | | 20:1 | 6.2 | 2.12 |
| Example 2-3 | | | | 40:1 | 7.4 | 1.65 |
| Comparative Example 2 | — | — | — | | 9.1 | 1.32 |

TABLE 4

| | $LS_{P1}$ (μm) | $LS_{P2}$ (μm) | $LS_{P1}/LS_{P2}$ | Mixing ratio (v:v) | Porosity (%) | Capacitance (nF) |
|---|---|---|---|---|---|---|
| Example 3-1 | 4.2 | 0.7 | 6.00 | 20:1 | 6.3 | 2.05 |
| Example 3-2 | | | | 40:1 | 5.8 | 2.26 |
| Example 3-3 | | | | 60:1 | 6.8 | 1.95 |
| Comparative Example 3 | — | — | — | | 9.1 | 1.32 |

Referring to Tables 2 to 4, it is confirmed that the capacitors according to Examples 1-1 to 3-3 have a lower porosity than Comparative Examples 1 to 3, thus the capacitance thereof is increased.

Example II

Example 4

A Pt electrode is formed on a Si substrate laminated with $SiO_2$ and $TiO_2$ according to a sputtering in a thickness of 200 nm to provide a lower electrode. Subsequently, the nanosheet solution obtained from Synthesis Example 3 and the nanosheet solution obtained from Synthesis Example 4 are mixed at a volume ratio of 5:1 to provide a mixed nanosheet solution, and the mixed nanosheet solution is coated on the lower electrode according to Langmuir-Blodgett method (KSV NIMA) at a speed of rising the substrate of 0.5 mm/min to provide a 2D nanosheet monolayer. Subsequently, the remaining polymer is removed by supplying UV, and then it is dried in an oven. Subsequently, a $Ba_{0.5}Sr_{0.5}TiO_3$ ceramic bulk dielectric material is deposited on the 2D monosheet monolayer by a magnetron RF sputtering (RF power density: 1 W/cm$^2$, deposition pressure: 2 Pa, supplying gas: argon (20 sccm), substrate temperature: room temperature (25° C.)). Subsequently, the substrate is annealed at 500° C. for 1 hour under 02 atmosphere to provide a $Ba_{0.5}Sr_{0.5}TiO_3$ bulk dielectric layer having a thickness of 200 nm. Subsequently, a Pt electrode is formed on the $Ba_{0.5}Sr_{0.5}TiO_3$ bulk dielectric layer to provide a capacitor.

Example 5

A Pt electrode is formed on a Si substrate laminated with SiO$_2$ and TiO$_2$ according to a sputtering in a thickness of 200 nm to provide a lower electrode. Subsequently, the nanosheet solution obtained from Synthesis Example 3 and the nanosheet solution obtained from Synthesis Example 4 are mixed at a volume ratio of 5:1 to provide a mixed nanosheet solution, and the mixed nanosheet solution is coated on the lower electrode according to Langmuir-Blodgett method (KSV NIMA) at a speed of rising the substrate of 0.5 mm/min to provide a 2D nanosheet monolayer. Subsequently, the remaining polymer is removed by supplying UV and dried in an oven. Subsequently, a $Ba_{0.5}Sr_{0.5}TiO_3$ ceramic bulk dielectric material is deposited on the lower 2D monosheet monolayer by a magnetron RF sputtering (RF power density: 1 W/cm$^2$, deposition pressure: 2 Pa, supplying gas: argon (20 sccm), substrate temperature: room temperature (25° C.)). Subsequently, the substrate is annealed at 500° C. for 1 hour under 02 atmosphere to provide a $Ba_{0.5}Sr_{0.5}TiO_3$ bulk dielectric layer having a thickness of 200 nm. Subsequently, a mixed nanosheet solution that the nanosheet solution according to Synthesis Example 3 and the nanosheet solution according to Synthesis Example 4 are mixed at a volume ratio of 5:1 is coated on a $Ba_{0.5}Sr_{0.5}TiO_3$ ceramic layer according to Langmuir-Blodgett method (KSV NIMA) at a speed of rising the substrate of 0.5 mm/min to provide an upper 2D nanosheet monolayer. Subsequently, the remaining polymer is removed by supplying UV, and then it is dried in an oven. Subsequently, a Pt electrode is formed on the upper 2D nanosheet monolayer to provide a capacitor.

Comparative Example 4

A capacitor is fabricated in accordance with the same procedure as in Example 5, except that the 2D nanosheet monolayer is not formed.

[Evaluation IV]

The capacitors according to Examples 4 and 5 and Comparative Example 4 are evaluated for an apparent relative permittivity.

The results are shown in Table 5.

TABLE 5

|  | Apparent relative permittivity($\varepsilon$ r) |
| --- | --- |
| Example 4 | 590 |
| Example 5 | 620 |
| Comparative Example 4 | 450 |

Referring to Table 5, it is confirmed that the capacitors according to Examples 4 and 5 have higher apparent relative permittivity than that of the capacitor according to Comparative Example 4.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A ceramic electronic component, comprising:
a pair of electrodes facing each other, and
a dielectric layer between the pair of electrodes and including a nanosheet monolayer film in which a plurality of ceramic nanosheets is arranged in a monolayer,
wherein the plurality of ceramic nanosheets have a multimodal lateral size distribution expressed by at least two separated peaks,
wherein the plurality of ceramic nanosheets includes:
a first ceramic nanosheet group, the first ceramic nanosheet group showing a lateral size distribution in a region of at least a pan of about 1 micrometer to about 10 micrometers and having a first peak shown in a lateral size greater than or equal to about 1.5 micrometers,
a second ceramic nanosheet group, the second ceramic nanosheet group having an average lateral size smaller than that of the first ceramic nanosheet group and having a second peak separated from the first peak and shown in a lateral size smaller than the lateral size of the first peak.

2. The ceramic electronic component of claim 1, wherein the lateral size at the first peak is about 1.5 micrometers to about 10 micrometers, and
the lateral size at the second peak is less than or equal to about 1.0 micrometers.

3. The ceramic electronic component of claim 1, wherein a ratio of the lateral sizes at the first peak and the second peak is about 2:1 to about 10:1.

4. The ceramic electronic component of claim 1, wherein the lateral size at the first peak is from about 2.0 micrometers to about 5.0 micrometers,
the lateral size at the second peak is from about 0.5 micrometers to about 1.0 micrometers, and
a ratio of the lateral size at the first peak and the lateral size at the second peak is from about 2.4:1 to about 6:1.

5. The ceramic electronic component of claim 1, wherein the first ceramic nanosheet group and the second ceramic nanosheet group are included at a volume ratio of about 5:1 to about 100:1.

6. The ceramic electronic component of claim 1, wherein the plurality of ceramic nanosheets has a bimodal lateral size distribution expressed by two separated peaks.

7. The ceramic electronic component of claim 1, wherein the dielectric layer has a porosity less than or equal to about 9.0%,
wherein the porosity is a ratio of a pore area with respect to a total area of the dielectric layer.

8. The ceramic electronic component of claim 1, wherein the plurality of ceramic nanosheets has a permittivity greater than or equal to about 50.

9. The ceramic electronic component of claim 1, wherein the plurality of ceramic nanosheets includes $Ca_2Nb_3O_{10}$, $Ca_2NaNb_4O_{13}$, $Ca_2Na_2Nb_5O_{16}$, $Sr_2Nb_3O_{10}$, $SrBi_4Ti_4O_{15}$, $Ti_2NbO_7$, $LaNb_2O_7$, or a combination thereof.

10. The ceramic electronic component of claim 1, wherein the ceramic nanosheet is a structure exfoliated from the ceramic powder.

11. The ceramic electronic component of claim 1, wherein the dielectric layer includes one or at least two of the nanosheet monolayer film including the plurality of ceramic nano sheets.

12. The ceramic electronic component of claim 1, wherein the dielectric layer has a thickness less than or equal to about 0.5 micrometer.

13. The ceramic electronic component of claim 1, wherein the dielectric layer includes
a first dielectric layer including the plurality of ceramic nanosheets and
a second dielectric layer disposed on the first dielectric layer and including a bulk ceramic dielectric material.

14. The ceramic electronic component of claim 1, wherein the dielectric layer includes:
a first dielectric layer including the plurality of ceramic nanosheets,
a second dielectric layer disposed on the first dielectric layer and including a bulk ceramic dielectric material, and
a third dielectric layer disposed on the second dielectric layer and including the plurality of ceramic nanosheets.

15. The ceramic electronic component of claim 1, wherein the dielectric layer includes:
a plurality of grains including a bulk ceramic dielectric material, and
a grain boundary including the plurality of ceramic nanosheets.

16. The ceramic electronic component of claim 1, wherein the ceramic electronic component is a multi-layer ceramic capacitor, and
wherein the multi-layer ceramic capacitor has a structure in which a unit capacitor including the pair of electrodes and the dielectric layer is laminated in plural.

17. A method of manufacturing a ceramic electronic component, the method comprising:
synthesizing a layered ceramic powder,
preparing a plurality of ceramic nanosheets having different lateral size distributions by exfoliating the layered ceramic powder,
forming the plurality of ceramic nanosheets, in a monolayer on a first electrode to provide a dielectric layer including a nanosheet monolayer film, and
forming a second electrode on the dielectric layer,
wherein the plurality of ceramic nanosheets has a multimodal lateral size distribution expressed by at least two separated peaks,
wherein the preparing the plurality of ceramic nanosheets includes:
preparing a first ceramic nanosheet group having a lateral size distribution in a region of at least a part of about 1 micrometer to about 10 micrometers and showing a first peak in a lateral size greater than or equal to about 1.5 micrometers,
preparing a second ceramic nanosheet group having an average particle size smaller than that of the first ceramic nanosheet group and showing a second peak in a lateral size smaller than the lateral size of the first peak, and
mixing the first ceramic nanosheet group and the second ceramic nanosheet group.

18. The method of claim 17, wherein each of the preparing the first ceramic nanosheet group and the preparing the second ceramic nanosheet group includes performing at least one of a heat treatment and a centrifuging,
wherein the preparing the first ceramic nanosheet group performs a heat treatment at a higher temperature than that in the preparing the second ceramic nanosheet group, and
wherein the preparing the first ceramic nanosheet group performs a centrifuging at a slower speed than that in the preparing the second ceramic nanosheet group.

19. The method of claim 17, wherein the mixing the first ceramic nanosheet group and the second ceramic nanosheet group is performed by mixing the first ceramic nanosheet group and the second ceramic nanosheet group at a volume ratio of about 5:1 to about 100:1.

20. The method of claim 17, wherein the providing the dielectric layer includes:
preparing a ceramic nanosheet solution including the plurality of ceramic nanosheets, and
coating the ceramic nanosheet solution on the first electrode by a Langmuir-Blodgett method, a Layer-by-Layer method, a spin coating, a slit coating, a bar coating, or a dip coating to provide the nanosheet monolayer film.

21. The method of claim 20, wherein the providing the dielectric layer includes repeatedly performing the forming the nanosheet monolayer film for a plurality of times to provide a plurality of nanosheet monolayer films.

22. An electronic device comprising a ceramic electronic component, the ceramic electronic component comprising:
a pair of electrodes facing each other, and
a dielectric layer between the pair of electrodes and including a nanosheet monolayer film in which a plurality of ceramic nanosheets is arranged in a monolayer,
wherein the plurality of ceramic nanosheets have a multimodal lateral size distribution expressed by at least two separated peaks,
wherein the plurality of ceramic nanosheets includes:
a first ceramic nanosheet group, the first ceramic nanosheet group showing a lateral size distribution in a region of at least a part of about 1 micrometer to about 10 micrometers and having a first peak shown in a lateral size greater than or equal to about 1.5 micrometers,
a second ceramic nanosheet group, the second ceramic nanosheet group having an average lateral size smaller than that of the first ceramic nanosheet group and having a lateral size of the first peak.

* * * * *